J. E. LOWE.
PROP FOR MOTOR CYCLES AND THE LIKE.
APPLICATION FILED OCT. 6, 1909.
998,703.
Patented July 25, 1911.
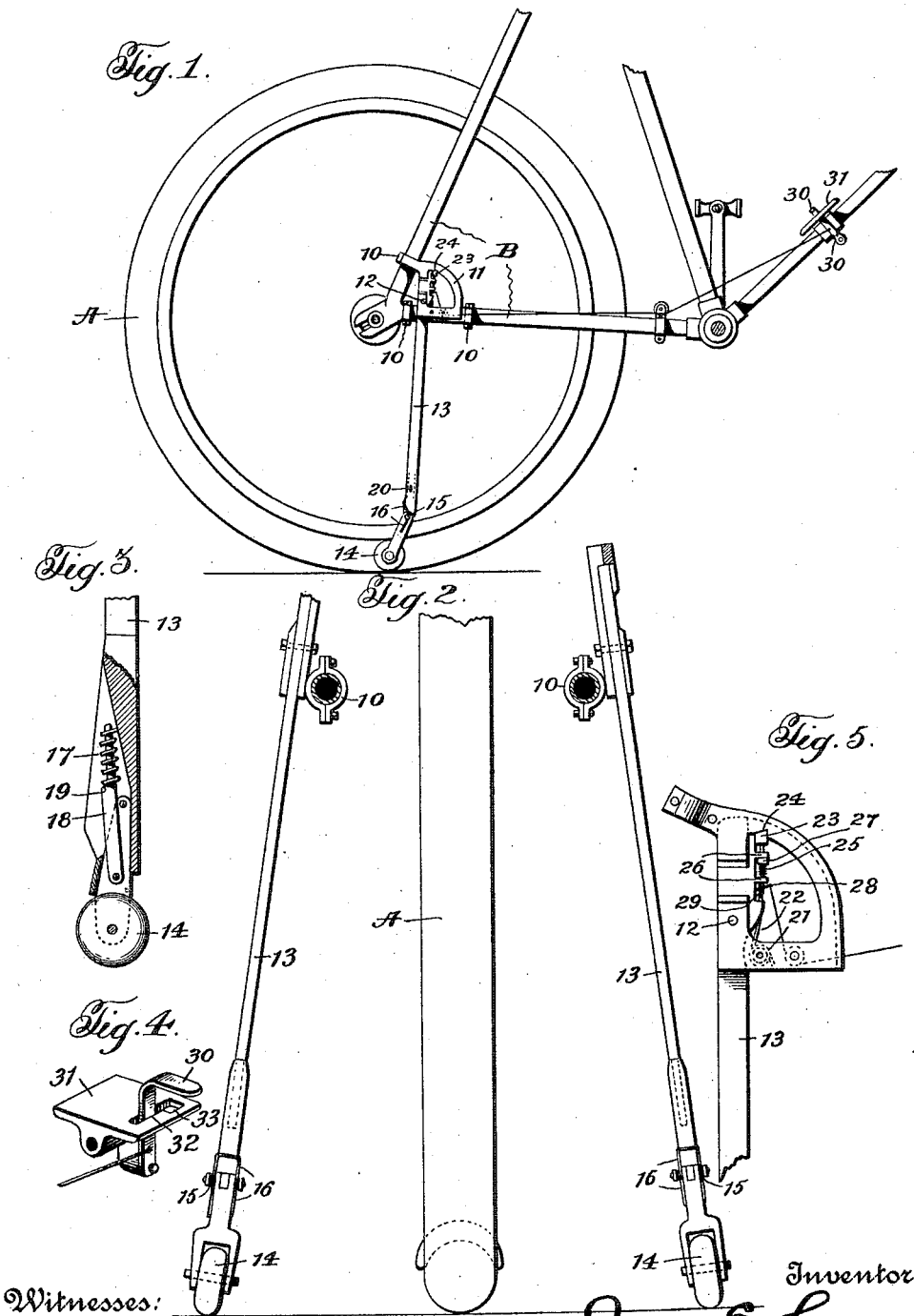

UNITED STATES PATENT OFFICE.

JAMES E. LOWE, OF NORFOLK, VIRGINIA.

PROP FOR MOTOR-CYCLES AND THE LIKE.

998,703. Specification of Letters Patent. Patented July 25, 1911.

Application filed October 6, 1909. Serial No. 521,196.

*To all whom it may concern:*

Be it known that I, JAMES E. LOWE, of Norfolk, in the county of Norfolk and in the State of Virginia, have invented a certain new and useful Improvement in Props for Motor-Cycles and the Like, and do hereby declare that the following is a full, clear, and exact description thereof.

My invention relates to props or supports for motor cycles and other two wheeled vehicles of such nature, and my object is to provide in an exceedingly simple and thoroughly compact form a prop or support that may be moved into ground-engaging position without first bringing the motor cycle to a stop, and be elevated from ground-engaging position while the vehicle is in motion, and incidentally permitting its use while the vehicle is in motion as a supporting or sustaining means, which may be desirable in the case of inexperienced or timid riders, and to this end my invention consists in the prop or support constructed substantially as hereinafter specified and claimed.

In the accompanying drawings, Figure 1 is a side elevation of a motor cycle equipped with a prop or support embodying my invention; Fig. 2 an end elevation thereof; Fig. 3 a side elevation similar to Fig. 1 but including only a portion of the motor cycle with a prop or support embodying my invention, but of a different construction from that shown in the other figures; Fig. 4 a detail view in perspective of the foot rest and releasing device that I preferably use, and Fig. 5 a detail view in side elevation on a larger scale of the leg or prop pivoting and latching means.

Referring to the drawings, A designates the rear wheel and B the usual frame of a motor cycle. Contiguous to the rear axle at each side of the rear wheel, I attach to the horizontal and vertical bars of the rear fork by suitable clips 10, a quadrant shaped frame 11. Pivoted to said frame, as by a pin or bolt 12 near one end, is a leg or prop 13, which at its ground-engaging end is provided with a roller or wheel 14, preferably wholly of rubber, although it may have simply a rubber tire. The prop or leg is jointed a short distance above the wheel, a hinge or pivot pin passing through overlapping members of the joint, and a suitable spring device is provided to yieldingly hold the wheel or roller in ground-engaging position, this yielding connection being employed to allow the wheel or roller to readily pass over any obstruction when being moved to or in ground-engaging position, which otherwise might break the leg or prop. As shown in Fig. 1, the spring device may be in the form of a spring 15 of several coils concentric with the hinge with oppositely extending arms 16 that engage respectively the two portions of the leg or prop on opposite sides of the hinge. As shown in Fig. 3, an ordinary helical spring 17 is used, through which passes a plunger 18 that is pivotally connected to the wheel-carrying member at one end, and has a shoulder 19 at the other end that engages the spring at one end, the other end of the spring being suitably fixed. Besides this provision of a yieldingly held jointed connection to save the leg or prop from breakage, it is constructed to be adjustable lengthwise, which adjustment may be provided for by forming the leg member above the hinge of two parts telescopically connected, a set screw 20 being provided to secure the telescoping parts in the position to which they may be adjusted.

As I prefer to embody my invention, the movement of the legs to the ground-engaging position is effected automatically, and for this purpose I provide a spring 21 which I mount on the quadrant-shaped bracket 11 which has an arm 22 that bears against the side of the leg or prop beyond the pivot thereof so as to act to swing the wheel-carrying end into ground-engaging position when the spring is free to act, a suitable latch, hereafter described, being provided to restrain or prevent this action of the spring until the rider elects to have the leg or prop thrown into ground-engaging position. To positively lock the leg or prop in ground-engaging position, and not depend on the spring 21 to maintain it there, I attach to the upper end of the leg or prop a latch which as shown consists of a sliding bolt 23 that at its outer end is adapted to engage a notch 24 in the curved portion of the bracket 11, said bolt being pressed and held yieldingly in notch-engaging position by a coil spring 25 encircling it, and situated between one of a pair of guide lugs 26 through which the bolt shank passes, and a collar 27 on said shank. To withdraw the bolt from engagement with a notch, I pivot to the leg or prop contiguous to the bolt a lever 28 that engages a lug or projection 29 on the shank of the bolt, and at its free end is connected to a cord or chain that passes over suitable guide rollers to an operating lever, which may be in the form of a pedal or foot lever 30 pivoted to a bracket or plate 31 fastened to the lower forward member of the vehicle frame. The lever 30 plays through a slot 32 in the bracket 31. and its shank is adapted to be sprung laterally to engage with and be disengaged from a locking notch 33 offset from the slot 32 at one end thereof. The lever 30 thus constitutes the latch device for holding the leg or prop in raised position against the action of the spring 21, and the means for swinging the leg or prop from the ground to its position out of use.

The bracket 31 is useful as a foot rest so that the rider need not keep his feet on the crank pedals of the vehicle.

The curved or arc-shaped portion of the frame 11 is slotted or grooved on its concave side to receive the upper end of the leg or prop and guide and support the same.

It will be observed that the point of attachment of the legs or props is sufficiently high to enable them to stand at an angle, when engaging the ground, that will give all required stability or support to the vehicle.

Of course, changes in the form and relations of parts may be made which will involve no departure from my invention.

Having thus described my invention, what I claim is—

1. The combination of a movable leg, a spring acting to move it to ground-engaging position, means to lock it in ground-engaging position, and a combined operating element and latch to move said leg or prop in opposition to the spring and hold it.

2. The combination of a movable leg, automatic means to move it in one direction, a latch mounted on and movable with the leg, and means connected with said latch to move the leg in the opposite direction.

3. The combination of a movable leg, automatic means to move it in one direction, a latch mounted on and movable with the leg, means to move the leg in the opposite direction connected with said latch, and means to hold said leg moving means stationary.

4. The combination of a bracket, a leg pivoted thereto, a spring acting to swing it downward, a latch mounted on said leg adapted to engage a locking notch in the bracket, an operating cord running from the latch to release the same and swing the leg, and an operating lever to which said cord runs.

In testimony that I claim the foregoing I have hereunto set my hand.

JAMES E. LOWE.

Witnesses:
 E. L. BUCKNAN,
 H. G. BARKEE.

---

Copies of this patent may be obtained for five cents each, by addressing the "Commissioner of Patents, Washington, D. C."